INVENTORS
SACHIO ITO
SEIICHI HIRANO
BY Lewis H. Eslinger
ATTORNEY

March 10, 1970   SACHIO ITO ET AL   3,500,084
ELECTRIC MOTOR WITH SUPPORT FRAME AND VIBRATION SUPPRESSORS
Filed March 26, 1968   2 Sheets-Sheet 2

INVENTORS
SACHIO ITO
BY SEIICHI HIRANO
Lewis H. Eslinger
ATTORNEY

United States Patent Office 3,500,084
Patented Mar. 10, 1970

3,500,084
ELECTRIC MOTOR WITH SUPPORT FRAME
AND VIBRATION SUPPRESSORS
Sachio Ito and Seiichi Hirano, Tokyo, Japan, assignors to Sony Corporation, Tokyo, Japan, a corporation of Japan
Filed Mar. 26, 1968, Ser. No. 716,076
Claims priority, application Japan, Mar. 27, 1967, 42/25,157, 42/25,158, 42/25,159
Int. Cl. H02k 5/24
U.S. Cl. 310—51                    13 Claims

ABSTRACT OF THE DISCLOSURE

An electric motor includes a motor support frame, a main motor assembly and vibration pad means which support the main motor assembly from the motor support frame and isolates the latter from the operational vibrations of the former. Spaced, opposed surface portions of said main motor assembly and said support frame are provided and are operative, upon deviation of the former relative to the latter, to limit the extent of said deviation to the extent of the spaces between the said opposed surface portions and prevent extreme loading of said vibration pad means.

---

This invention relates to a new and improved electric motor and, more specifically, to a somewhat miniaturized electric motor which is particularly adapted for use in electronic apparatus in the nature of magnetic sound recording and reproducing apparatus.

In electric motors of this nature in the prior art, a vibration pad is generally disposed between a portion of the main motor assembly, namely, a support yoke to which the motor stator is fixed, and the support member by which the motor is normally fixed to a motor mounting plate thereby effecting the elastic support of the main motor assembly from the said support member. As a result, some if not all of the operational vibrations of the main motor assembly are absorbed by the vibration pad, thus at least partially isolating the respective motor support member and motor mounting plate therefrom. By such constructions, however, the electric motor is rendered quite susceptible to shock damage, as might be occasioned by the accidental dropping thereof, in that the thusly developed impact forces are transmitted directly from the relatively massive main motor assembly to the vibration pads and must, of necessity, be totally absorbed by the latter with resultant damage in the nature of vibration pad deformation or separation being quite probable.

It is, accordingly, an object of this invention to provide an electric motor which is extremely resistant to shock damage.

Another object of this invention is to provide an electric motor in which the operational vibrations thereof are substantially isolated from a motor mounting plate and in which those operational vibrations which are transmitted to a motor mounting plate which is disposed substantially perpendicularly with regard to the motor shaft, will be ineffective to vibrate the thusly disposed mounting plate.

Another object of this invention is to provide an electric motor wherein the clearance between the main motor assembly and the motor supporting structure are held to absolute minimums to result in a more compact motor.

Still another object of this invention is to provide an electric motor which is somewhat further miniaturized through the effective use of the internal motor spaces formed within the respective coil-ends of the motor stator assembly for mounting of the rotor shaft bearings.

In accordance with one aspect of this invention, an electric motor is provided which comprises a support frame and a main motor assembly supported therefrom through vibration pads which are disposed therebetween to substantially isolate the operational vibrations of the main motor assembly from the said support frame. Spaced surfaces are provided at a plurality of opposed points on said main motor assembly and said support frame and are operative, while permitting some deviation of the former relative to the latter, to limit such deviation to a range determined by the extent of the spaces therebetween. More specifically, as utilized herein, the term "main motor assembly" means an assembly comprising the motor stator, the motor rotor mounted in concentric relationship therewith and having a rotor shaft, and a plurality of support yokes in which said rotor shaft is journalled and which function to support said motor stator relative thereto. In accordance with this invention, the spaced surfaces are formed on four diagonally opposed portions of the outer peripheries of the support yokes and on four correspondingly disposed portions of the support frame, with all of the said contacting surfaces being faced in the generally longitudinal direction as determined by the orientation of the rotor shaft. Accordingly, longitudinal deviation of the main motor assembly relative to the support frame, in either direction, is limited to the extent of the spaces between the respective contacting surfaces, as is twisting of the main motor assembly relative to the support frame.

In accordance with another feature of this invention, the spaces formed within the respective coil ends of the motor stator are utilized for the mounting of the rotor shaft bearings to thus reduce the overall longitudinal extent of the motor. Further, provision is made for the disposition of the transversely extending portions of the support frame within grooves provided therefor in the outer surfaces of the respective motor support yokes, and the outer surfaces of the said support frame portions are substantially flattened and flush with the outer support yoke surfaces to thus further reduce the longitudinal extent of the motor.

The above and other objects and advantages of this invention are believed made clear by the following detailed description thereof taken in conjunction with the accompanying drawings wherein:

FIGURE 3 is a cross-sectional view illustrating the di-

Figure 1:
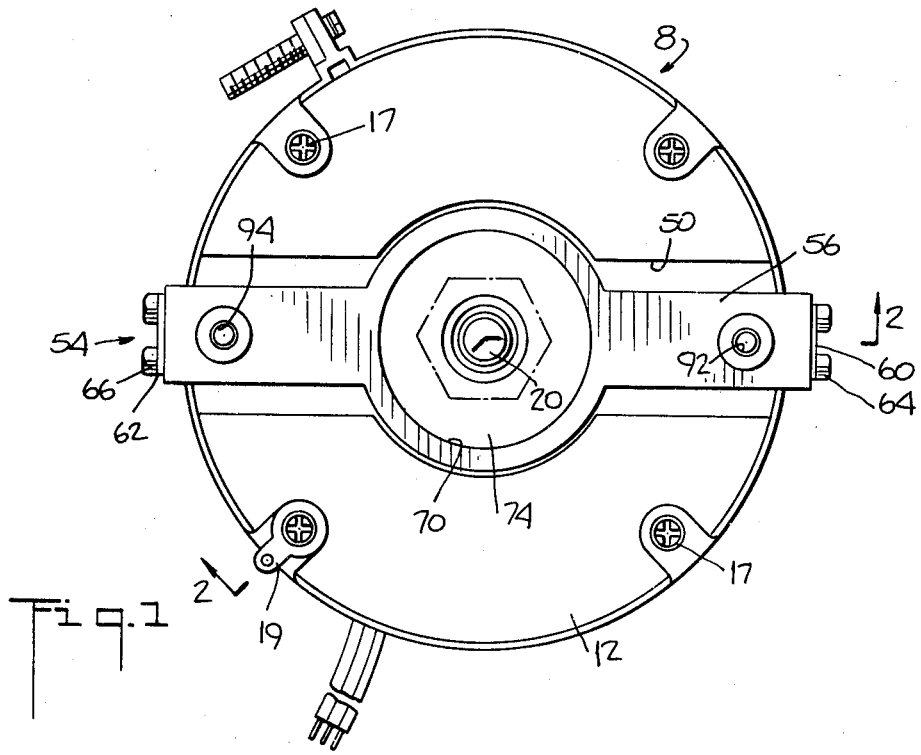
FIGURE 1 is an end plan view of an electric motor constructed in accordance with the teachings of my invention.
Figure 2:
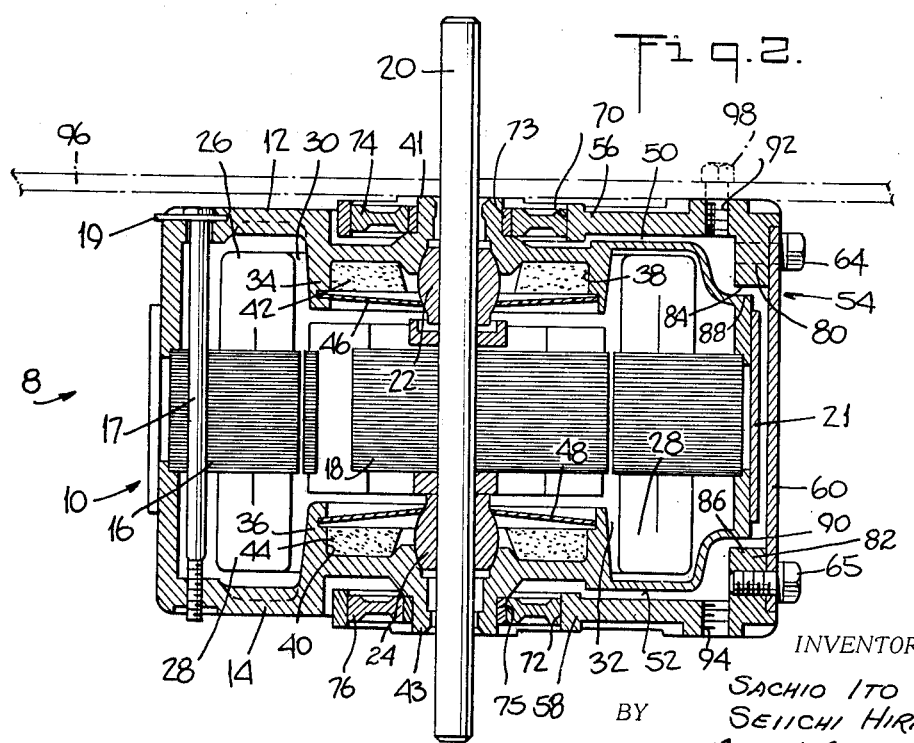
FIGURE 2 is a vertical cross-sectional view taken substantially along line 2—2 in FIG. 1.

Referring now to FIGURES 1 and 2, the electric motor 8 depicted therein may be seen to comprise a main motor assembly as indicated generally at 10, a motor support frame, generally indicated at 54 and vibration pads 74 and 76 disposed as shown between the said main motor assembly and support frame to support the former from the latter. As seen in FIGURE 2, the main motor assembly 10 comprises a pair of spaced, generally cup-shaped support yokes 12 and 14 between which is disposed the motor stator 16. Support bolts 17 extend as shown through the respective support yokes to maintain the same firmly clamped against stator 16, and a ground terminal 19 extends from one of the support bolts 17. A tightening band 21 extends around peripheral portions of the support yokes 12 and 14 to lend further structural integrity to the main motor assembly 10.

A rotor 18 is supported from a rotor shaft 20 and is disposed, in conventional manner, within a cavity provided therefor in the stator 16 and in concentric relation with the latter. Shaft bearings 22 and 24 are supported as shown from the respective support yokes to in turn journal the rotor shaft 20 for rotation therein, it being noted that the said shaft may extend as shown from both ends of the motor 8 or may, alternatively, extend from only one end of the latter. The support yokes 12 and 14 are of thicknesses which are predetermined to lend suitable strength characteristics thereto and are, of course, of the depicted generally symmetrical or mirror image configurations.

Generally annular spaces 30 and 32 are provide between the respective coil-ends 26 and 28 of the stator assembly 16 and, as seen in FIG. 2, support yokes 12 and 14 include, respectively, annular projections 34 and 36 which extend into the annular spaces 30 and 32. Annular springs 46 and 48 are provided and retained as illustrated adjacent the respective extremities of the yoke projections 34 and 36 to bear against the bearings 22 and 24 and maintain the latter in position in firm surface contact with adjacent portions of the respective support yokes.

Annular oil rings 42 and 44, which are preferably of felt or the like and may, for example, take the form of those marketed under the registered trademark "Moltoplen," are saturated with lubricating oil and disposed as shown within annular cavities 38 and 40 provided therefor within the respective annular yoke projections 34 and 36. In addition, the respective support yokes 12 and 14 include annular projections 41 and 43, which extend outwardly to normally surround but not contact the adjacent surface portions of the rotor shaft 20. Grooves 50 and 52 are formed to extend, as best seen for groove 50 in FIG. 1, diametrically across the respective outer surfaces of the support yokes 12 and 14.

The support frame 54 is of generally rectangular configuration and comprises support rods 56 and 58 which are disposed as shown in the respective support yoke grooves 50 and 52. In addition, the support frame 54 includes connecting plates 60 and 62, which are connected as by screws 64, 65 and 66 to respective support rods 56 and 58 adjacent the respective extremities of the latter.

The support rods 56 and 58 respectively include openings 70 and 72 formed therein in concentric relationship with the rotor shaft 20. The yoke projections 41 and 43 extend through the respective support rod openings 70 and 72, and ring members 73 and 75 are disposed as shown around the said support yoke projections.

Figure 3:
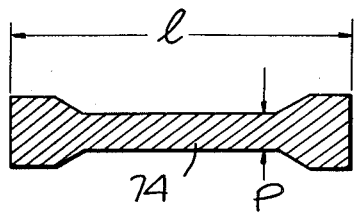
FIGURE 3 is a cross sectional view illustrating the dimensions of a motor vibration pad.

Generally ring-shaped vibration pads 74 and 76 are disposed in the spaces provided therefor between the surfaces of the openings 70 and 72 and the peripheral surfaces of the ring members 73 and 75, and the respective vibration pads are preferably bonded as by vulcanization, to the said surfaces. The vibration pads 70 and 72 can be made from any suitable vibration isolating material with good wear characteristics, as for example, rubber, and are preferably configured to be substantially longer, as measured radially, than they are thick. More specifically, and as made clear by FIGURE 3 for vibration pad 74, the radial extent $l$ thereof is substantially greater than the thickness P. Thus it is believed made clear whereby the main motor assembly 10 is supported from the generally rectangular support frame 54 in such manner that the transmission of vibrational or shock forces therebetween is significantly inhibited.

Referring again to the support rods 56 and 58 of the support frame 54, the former may be seen to include bosses 80 and 82 formed thereon and having surface portions 84 and 86 which face generally longitudinally to oppose generally longitudinally facing surface portions 88 and 90 of the respective support yoke members 12 and 14, and are slightly spaced therefrom. Although not illustrated in the drawings, it is to be understood that similarly spaced and opposed surface portions are provided by respective support yoke and support member boss surfaces to the other side of the motor assembly as seen in FIG. 2. Accordingly, deviation of the main motor assembly 10 in the generally longitudinal direction, as determined by rotor shaft 20 is limited to the longitudinal dimension of the spaces provided between these respective main motor assembly and support frame surface portions. More specifically, should the main motor assembly 10 tend to move upwardly as seen in FIG. 2 against the restraining force of the respective vibration pads 74 and 76, this upward movement would be limited to the extent determined by the longitudinal dimension of the space between surface portions 84 and 88, and the corresponding, though not illustrated, space between the corresponding surface portions located to the other side of the motor. This upward movement would, of course, be terminated upon contact between these surface portions. In like manner, any downward movement of the main motor assembly 10 as seen in FIG. 2 would be limited by the longitudinal dimension of the space provided between surface portions 86 and 90 and the non-illustrated, corresponding surface portions located to the other side of the motor assembly.

In addition, these same spaced, support yoke and support member boss surfaces would also function to inhibit or limit any tendency of the main motor assembly 10 to deviate from the substantially longitudinal orientation thereof within the support frame 54. More specifically, it may be noted that should the main motor assembly 10 tend to twist in the counterclockwise direction as seen in FIG. 1, the extent to which such twisting could occur would again be limited by the ultimate contact between surface portions 84 and 88 and/or surface contact between the non-illustrated yoke and support frame boss surfaces disposed diagonally therefrom to the other side of the motor. In practice, these spaces between opposed support yoke and support member boss surface portions would be made as small as possible commensurate with enabling slight main motor assembly-support frame deviation before providing for main motor assembly-support frame vibration transmission through firm surface contact therebetween.

The motor embodiment of FIGS. 1 and 2 is particularly adapted for convenient mounting in electronic equipment in the nature of magnetic sound recording and reproducing apparatus and, to this effect, the respective support rods 56 and 58 include outwardly facing, threaded bores 92 and 94 formed therein. Thus, and for mounting, for example, to an equipment mounting plate as indicated in phantom at 96 in FIG. 2, the motor would be disposed against a plate surface as shown, and mounting screws 98 passed through the former into the threaded bores 92 or 94 to effect the motor mounting.

With the motor 8 thusly mounted to a mounting plate 96, it may be understood that operational vibrations of the former, as occasioned by rotation of the rotor assembly 18, will of course be transmitted through bearings 22 and 24 to the respective yoke members 12 and 14, but that the disposition of the vibration pads 74 and 76 between the said yoke members and the support rods 56 and 58 of the support frame 54 will greatly inhibit, if not altogether prevent, the further transmission of these operational vibrations to the said support frame. More specifically, since the respective shaft bearings 22 and 24 provide the only transmission path for the transmission of operational vibrations from the motor rotor assembly 18 to the respective support yokes 12 and 14, and since the said bearings are disposed in the yokes in close proximity to the respective vibration pads 74 and 76, it may be understood that the effectiveness of the latter is significantly enhanced to enable the absorption thereby of substantially all of these operational vibration forces. Further, since the thickness P of the vibration pads is preferably very small, the same will be quite resilient in the longitudinal direction and will thus be very effective in isolating vibrational forces which are oriented in this direction from the support rods 56 and 58 and accordingly from the support plate 96. Thus, the only vibrational forces, if any, which will be transmitted to the mounting plate 96 in the direction normal thereto (in which direction the said plate is of course most prone to vibrate) will be very small and ineffective to vibrate the said mounting plate.

Although the respective vibration pads 74 and 76 will be more effective to transmit vibrational forces in the transverse direction than they are in the longitudinal direction, due to the fact that $l>P$, the fact that these forces will be transmitted to the mounting plate 96 through screws 98 in the direction of the major dimension of the said mounting plate—namely lengthwise as seen in FIGURE 2—will operate to render the thusly transmitted, generally transverse vibrational forces ineffective to vibrate the said mounting plate since the latter is, of course, extremely resistant to vibration along its major length. Thus is believed made clear whereby the described motor mounting means will greatly inhibit, if not prevent entirely, the transmission of vibrational forces from the motor 8 to the mounting plate 96 of a nature which will be effective to vibrate the latter, whereby is prevented the generation or amplification of noise which might otherwise occur through vibration of the motor mounting plate 96. This would, in turn, render the electric motor 8 of FIGS. 1 and 2 particularly adaptable for use in magnetic sound recording and reproducing apparatus as should be obvious.

The configuration of the respective vibration pads 74 and 76 will, as discussed above, provide relatively significant resistance to transverse movement of the respective support yokes 12 and 14 relative to the mounting plate 96. Accordingly, this same relatively significant resistance to transverse movement will be applied with regard to the rotor shaft 20 to thereby minimize, if not prevent any transverse deviation of the shaft from the position thereof depicted in FIGURE 2, and this transverse shaft stability would, of course, greatly facilitate the connection thereto of drive means in the nature, for example, of a belt drive mechanism, for transmitting the rotation of the rotor shaft 22 to other shaft means.

In addition to providing for a more effective, vibration isolation mounting, the motor 8 exhibits much greater resistance to shock damage than do the motors of the prior art. More specifically, and assuming the motor 8 to be suddenly subjected to severe shock forces as might be occasioned, for example, by the accidental dropping thereof, to result in the application of relatively severe twisting forces to the main motor assembly 10 or the application of relatively severe longitudinally directed forces thereto, one or two of the pairs of opposed support rod boss and support yoke surface portions referred to hereinabove will almost immediately come into firm contact to thus prevent the relatively large forces generated by this abrupt movement of the relatively massive main motor assembly 10 from being applied abruptly to the respective vibration pads 74 and 76. This is to say that the said relatively high forces will be applied instead to the respective, relevant support rod boss surfaces and will accordingly be applied thereby as tensile forces to the respective connecting plates 60 and 62 to thus effectively prevent motor damage in the nature of deformation of the vibration pads 74 and/or 76, and/or the support rods 56 and 58. Thus is believed made clear whereby the motor 8 of my invention is much better able to absorb, without damage, the accidental application thereto of severe shock forces than are the motors of the prior art.

Further, since the respective vibration pads 74 and 76 are firmly bonded to the respective outer peripheral surfaces of the yoke projections and the inner peripheral surfaces of the ring members 73 and 75, separation therebetween would be most unlikely even under the most arduous of handling or operational conditions. Accordingly, even if the motor 8 were forced to operate with a continuous deviation of the rotor shaft 20 from the longitudinal as might, for example, be occasioned by improper connection or operation of a shaft-connected belt drive means as discussed above, the fact that the respective vibration pads 74 and 76 remain in firm contact with the respective yoke projection and ring member surfaces will insure that the operational vibrations, if any, of the motor 8 are nonetheless not effective to vibrate the motor mounting plate 96. In addition, this firm bonding of the respective vibration pad surfaces and the fact that the respective support rods 56 and 58 extend in radially opposed directions from the said vibration pads will insure that no downward displacement of the main motor assembly 10 relative to the support frame 54 will occur when the motor 8 is horizontally disposed.

Relative compactness of the motor 8 is achieved by configuring the respective support rods 56 and 58 to fit substantially within the support yoke grooves 50 and 52 to thus present substantially flat outer support yoke surfaces. In addition, the disposition of the respective shaft bearings 22 and 24 substantially within the coil end spaces 30 and 32 also renders the motor 8 more compact in that it permits the construction of a motor which is less extensive in the longitudinal direction as should be obvious.

Figure 4:
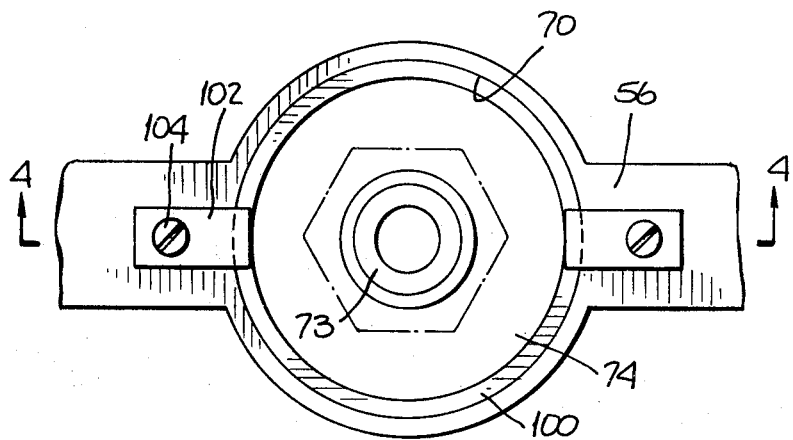
FIGURE 4 is an end plan view of a support member portion of an electric motor constructed in accordance with a second embodiment of my invention.
Figure 5:
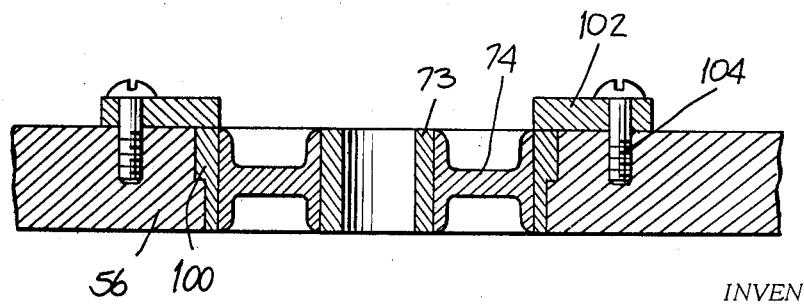
FIGURE 5 is a cross-sectional view taken along line 4—4 in FIGURE 4.

A somewhat different mounting for the respective vibration pads 74 and 76 is utilized in the motor embodiment depicted in FIGURES 4 and 5. Thus, as seen therein for vibration pad 74, a stepped, outer ring member 100 is disposed in a correspondingly shaped groove provided therefor in the peripheral surface of the opening 70 in the support member 56. Holding lugs 102 are provided and affixed as indicated by screws 104 to the outer surface of the support rod 56 to overlay the outer ring 100 and, in cooperation with the stepped construction of the latter, prevent longitudinal movement thereof as should be obvious. With this construction, the vibration pad 74 is first bonded, as by vulcanization as discussed above, at its inner peripheral surface to the inner ring member 73 and at its outer peripheral surface to the outer ring member 100 whereupon the resultant bonded vibration pad assembly is inserted into position in the support rod 56 by insertion of the stepped, outer ring member 100 into the stepped groove formed therefor in the former, the placement of the holding lugs 102 thereover to overlay the said outer ring, and the insertion and tightening of screws 104 into the said support rod. Accordingly it is believed made clear whereby the motor embodiment of FIGURES 4 and 5 offer somewhat greater ease with regard to the assembly of the vibration pads into the support rods, and the replacement of the former should the same become necessary.

It will be apparent that many modifications and variations in addition to those noted above may be effected in the described embodiments without departing from the spirit and scope of this invention as defined in the appended claims.

What we claim is:

1. In an electric motor which includes a motor support frame, a main motor assembly and vibration isolation means which support said main motor assembly from said support frame, said main motor assembly comprising spaced support yoke means having a stator disposed therebetween and a rotor disposed within said stator and having a rotor shaft which is journalled in bearings mounted in said support yoke means, said motor support frame having oppositely facing inwardly directed surface portions extending generally at right angles to the axis of said shaft, and said support yoke means having oppositely facing outwardly directed surface portions also extending generally at right angles to said axis and corresponding to said surface portions of the motor support frame which are confronted in normally spaced relation thereto, said corresponding surface portions of the motor support frame and the support yoke means being operative to contact each other upon deviation of said main motor assembly relative to said support frame, thereby to limit said deviation to the extent of the normal spacing between said corresponding surface portions.

2. In an electric motor as in claim 1 wherein, said stator comprises spaced coil-ends, and said support yoke means each comprise annular portions which extend inwardly between the respective stator coil-ends, said inwardly extending support yoke means portions providing bearing mounting means for the mounting of the rotor shaft bearings substantially within said coil-end spaces.

3. In an electric motor as in claim 1, wherein, said vibration isolation means comprise generally ring-shaped vibration pads which are disposed in generally concentric relationship with said rotor shaft and extend between spaced portions of said support yoke means and said support frame, respectively.

4. In an electric motor as in claim 3 wherein, said support frame comprises support rods which extend across the outer surfaces of said support yoke means and comprise generally circular openings formed therein in generally concentric relationship with said rotor shaft, said support yoke means each comprise outwardly extending annular portions which surround said shaft and are disposed in generally concentric relationship therewith with the surfaces of said support rod openings being spaced from the peripheral surfaces of said outwardly extending support yoke means portions, and said vibration pads are disposed between said surfaces and are connected thereto.

5. In an electric motor as in claim 4 wherein, said vibration pads are substantially longer, as measured radially, than they are thick.

6. In an electric motor as in claim 5, further comprising, ring members disposed around said outwardly extending portions of said support yoke means in surface contact therewith, and wherein said vibration pads extend between and are affixed to each of the surfaces of said support rod openings, and the peripheral surfaces of said ring members.

7. In an electric motor as in claim 5, wherein, first ring members are disposed around said outwardly extending portions of said support yoke means in surface contact therewith, second ring members are disposed within said support rod openings in surface contact therewith, and said vibration pads extend between said first and second ring members and are affixed to the respective surfaces thereof.

8. In an electric motor as in claim 6, further comprising retaining means for retaining said second ring members in said support rod openings.

9. In an electric motor as in claim 4 wherein, said support yoke means comprise grooves extending across the outer surfaces thereof and said support rods extend through and are substantially contained within said grooves.

10. In an electric motor as in claim 1 wherein, there are two of said surface portions on each of said support yoke means, said surface portions being disposed at generally opposed points adjacent the peripheries of each of said support yoke means.

11. In an electric motor as in claim 10 wherein, said support frame comprises support rods which extend across said support yoke means and comprise boss portions adjacent the respective extremities thereof which provide said support frame surface portions.

12. In an electric motor as in claim 11 wherein, said support frame further comprises generally longitudinally extending support plates which connect the respective extremities of said support rods whereby, impact forces which are transmitted from said main motor assembly to said support rods by contact between said opposed surface portions upon deviation of said main motor assembly will be applied to said connecting plates in the form of tensile forces and will not be applied to said vibration isolation means.

13. In an electric motor as in claim 12 wherein, said support rods comprise generally circular openings formed therein in generally concentric relationship with said rotor shaft, said support yoke means each comprise outwardly extending annular portions which surround said shaft and are disposed in generally concentric relationship therewith with the surfaces of said support rod openings being spaced from the peripheral surfaces of said outwardly extending support yoke means portions and said vibration pads are disposed between said surfaces and are connected thereto.

References Cited

UNITED STATES PATENTS

| 2,471,812 | 5/1949 | Christiano | 310—51 |
| 2,607,819 | 8/1952 | Sutton | 310—91 |
| 2,620,151 | 12/1952 | Peters | 248—26 |
| 3,114,060 | 12/1963 | Goettl | 310—51 |
| 3,270,222 | 8/1966 | Shaffer | 310—51 |

FOREIGN PATENTS 939,508  10/1963  Great Britain.

WARREN E. RAY, Primary Examiner

U.S. Cl. X.R.

310—89, 91